United States Patent [19]

Fitting et al.

[11] 4,105,977
[45] Aug. 8, 1978

[54] ADAPTIVE UNDESIRED SIGNAL CANCELLER

[75] Inventors: Robert C. Fitting; Gregory H. Piesinger, both of Scottsdale, Ariz.

[73] Assignee: Motorola, Inc., Schaumburg, Ill.

[21] Appl. No.: 776,141

[22] Filed: Mar. 10, 1977

[51] Int. Cl.² ............................................... H04B 1/12
[52] U.S. Cl. .................................. 325/472; 325/371; 325/475; 328/163; 328/166; 343/100 PE
[58] Field of Search ................. 325/56, 303, 305, 366, 325/367, 369, 371, 472, 473, 474, 475, 476; 343/100 PE; 179/1 P, 15 AN; 328/162, 163, 165, 166; 333/21 A; 179/15 BT, 15 IG

[56] References Cited

U.S. PATENT DOCUMENTS

| Re. 28,617 | 11/1975 | McShan | 179/15 BT |
|---|---|---|---|
| 3,965,422 | 6/1976 | Tagliaferri | 325/472 |

*Primary Examiner*—Robert L. Griffin
*Assistant Examiner*—Marc E. Bookbinder
*Attorney, Agent, or Firm*—Eugene A. Parsons

[57] ABSTRACT

A communications system including a first channel adapted to receive data on a first carrier and a second channel adapted to receive data on a second carrier having a frequency substantially equal to the frequency of the first carrier and polarized approximately orthogonal thereto and wherein degradation in the orthogonality occurs during transmission so that portions of the first carrier appear in the second channel and portions of the second carrier appear in the first channel, a summing device in each channel and apparatus for coupling a portion of the output signal from the summing device in one channel to the input of the summing device in the other channel, in the correct phase relationship and amplitude, so as to cancel the portion of the second carrier appearing in the first channel and the portion of the first carrier appearing in the second channel.

6 Claims, 2 Drawing Figures

ADAPTIVE UNDESIRED SIGNAL CANCELLER

BACKGROUND OF THE INVENTION

Making use of two orthogonally polarized signals simultaneously can double the capacity of a radio communications system. In practice, the two orthogonally polarized signals leaving the transmitter are either two orthogonal linearly polarized waves or two opposite circularly polarized waves. During transmission, the orthogonality of the waves may be degraded, or for various reasons cross-talk between channels may occur. Whatever the cause of polarization distortion, the failure to maintain orthogonality will produce two nonorthogonal elliptically polarized waves at the receiving terminal.

Orthogonality can be recovered at the receiving terminal by transforming the two nonorthogonal elliptically polarized waves into two orthogonal linear polarizations. Present art accomplishes this transformation by employing a differential phase shifter and a differential attenuator. This tranformation current takes place in the antenna waveguide by employing mechanical phase shifters and rotary joints. As such, the orthogonality obtained is limited to approximately 10 dB.

The present invention makes it possible to obtain orthogonality approaching 50 dB. The transformation process is fully automatic and will adapt substantially as quickly as the transmitting medium changes. This invention applies the technology of null steerers and adaptive antenna systems to achieve the improved performance.

SUMMARY OF THE INVENTION

The present invention pertains to an adaptive undesired signal canceller including first summing means adapted to receive a first signal accompanying a portion of a second signal, second summing adapted to receive the second signal accompanying a portion of the first signal, and apparatus for coupling a portion of the second signal from the second summing means, in appropriate phase and amplitude, to the first summing means for substantially cancelling the portion of the second signal accompanying the first signal and for coupling a portion of the first signal from the first summing means, in appropriate phase and amplitude, to the second summing means for substantially cancelling the portion of the first signal accompanying the second signal therein.

It is an object of the present invention to provide a new and improved adaptive undesired signal canceller.

It is a further object of the present invention to provide an adaptive undesired signal canceller for substantially eliminating nonorthogonality in a communications system including a first channel adapted to receive data on a first carrier and a second channel adapted to receive data on a second carrier having a frequency substantially equal to the frequency of the first carrier and polarized approximately orthogonal thereto and wherein degradation in the orthogonality occurs during transmission.

It is a further object of the present invention to provide an improved adaptive undesired signal canceller wherein orthogonality approaching 50 dB can be obtained and wherein the canceller is fully automatic and adapts quickly to transmitting medium changes.

These and other objects of this invention will become apparent to those skilled in the art upon consideration of the accompanying specification, claims and drawings.

DESCRIPTION OF THE PREFERRED EMBODIMENT

Figure 1:
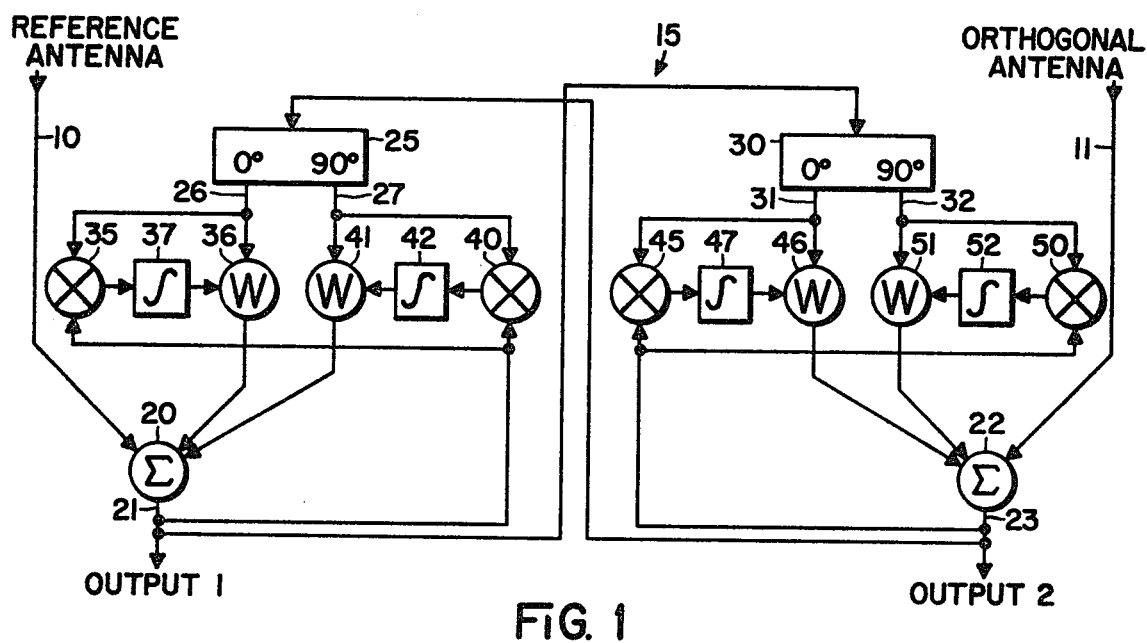
FIG. 1 is a block diagram of an adaptive cross modulation canceller embodying the present invention.

Referring to FIG. 1, an antenna, designated 10, generally represents a first channel. A second antenna, designated 11, generally represents a second channel. It should be understood that the first and second channels include circuitry other than the antennas 10 and 11, respectively, but because an adaptive undesired signal canceller, generally designated 15, embodying the present invention is inserted between the antennas 10 and 11 and the remainder of the apparatus in the first and second channels and because the remainder of the apparatus is not crucial to this invention, the first and second channels are represented by only the antennas 10 and 11 in the Figure. The first channel, antenna 10, is designed to receive data on a first carrier and the second channel, antenna 11, is designed to receive data on a second carrier having a frequency substantially equal to the frequency of the first carrier and polarized approximately orthogonally thereto. However, degradation in the orthogonality occurs during transmission so that portions of the first carrier appear in the second channel and portions of the second carrier appear in the first channel.

The output of the antenna 10 is connected to an input of a first summing device 20, which summing device 20 has an output 21 and at least two other inputs. The output of the antenna 11 is connected to one input of a second summing device 22, which summing device 22 has an output 23 and at least two other inputs. A first phase splitting device, which in this embodiment is a quadrature hybrid circuit 25, has an input connected to the output 23 of the second summing device 22, an in-phase output 26 and a quadrature output 27. A second phase splitting device, which in this embodiment is a second quadrature hybrid circuit 30, has an input connected to the output 21 of the first summing device 20, an in-phase output 31, and a quadrature output 32.

Signals at the output 26 of the hybrid 25 are applied to an input of a correlator 35, which may be a mixer or multiplier, and an output of a weighting device 36, which may be a pin diode attenuator or the like. The correlator 35 has an output which is connected through an integrator 37 to a second, or control, input of the weighting device 36 and the weighting device 36 has an output which is connected to an input of the summing device 20. A second input of the correlator 35 is connected to the output 21 of the summing device 20. Thus, the correlator 35 correlates the in-phase component of the output signal of the summing device 22 with the output signal of the summing device 20 and controls the weighting device 36 to null out any in-phase components of the second carrier which appear at the output 21 of the first summing device 20.

A signal at the quadrature output 27 of the hybrid circuit 25 is connected to an input of a correlator 40 and an input of a weighting device 41. An output of the correlator 40 is connected through an integrating circuit 42 to a second, or control, input of the weighting device 41 and the weighting device 41 has an output connected to another input of the summing device 20.

The output 21 of the summing device 20 is also connected to a second input of the correlator 40. Thus, the quadrature component of a signal at the output 23 of the summing device 22 is correlated with a signal at the output 21 of the summing device 20 and the weighting device 41 is adjusted to null out any quadrature component of the second carrier which appears at the output 21 of the summing device 20. By splitting the signals into in-phase and quadrature components and weighting each component independently, the input signal, which may be represented as a rotating vector, can be rotated in phase and altered in amplitude to produce an output vector of any amplitude and phase with respect to the input vector. Thus, a portion of the second carrier can be obtained at the output 23 of the summing device 22 and the phase and amplitude of that portion can be adjusted until it substantially counteracts or nulls out any portion of the second carrier appearing at the antenna 10.

Similarly, the in-phase output 31 of the hybrid 30 is connected to an input of a correlator 45 and an input of a weighting device 46. An output of the correlator 45 is connected through an integrator 47 to a second, or control, input of the weighting device 46 and an output of the weighting device 46 is connected to an input of the summing device 22. The quadrature output 32 of the hybrid 30 is connected to an input of a correlator 50 and to an input of a weighting device 51. An output of the correlator 50 is connected through an integrator 52 to a second, or control, input of the weighting device 51 and an output of the weighting device 51 is connected to another input of the summing device 22. The output 23 of the summing device 22 is connected to second inputs of the correlators 45 and 50. Thus, the in-phase and quadrature components of the first carrier are weighted independently to adjust the phase and amplitude of the portion of the first carrier applied to the summing device 22 to subtantially counteract or null out any portion of the first carrier which appears at the output of the antenna 11.

Thus, the signal at the output 21 of the summing device 20 is substantially the first carrier and the signal at the output 23 of the summing device 22 is subtantially the second carrier and the two signals are again subtantially orthogonal. The system disclosed continually tracks or adapts to variations and changes in the signal and, whereas orthogonality was limited to approximately 10 dB in the prior art, the disclosed embodiment makes it possible to obtain orthogonality approaching 50 dB.

Figure 2:
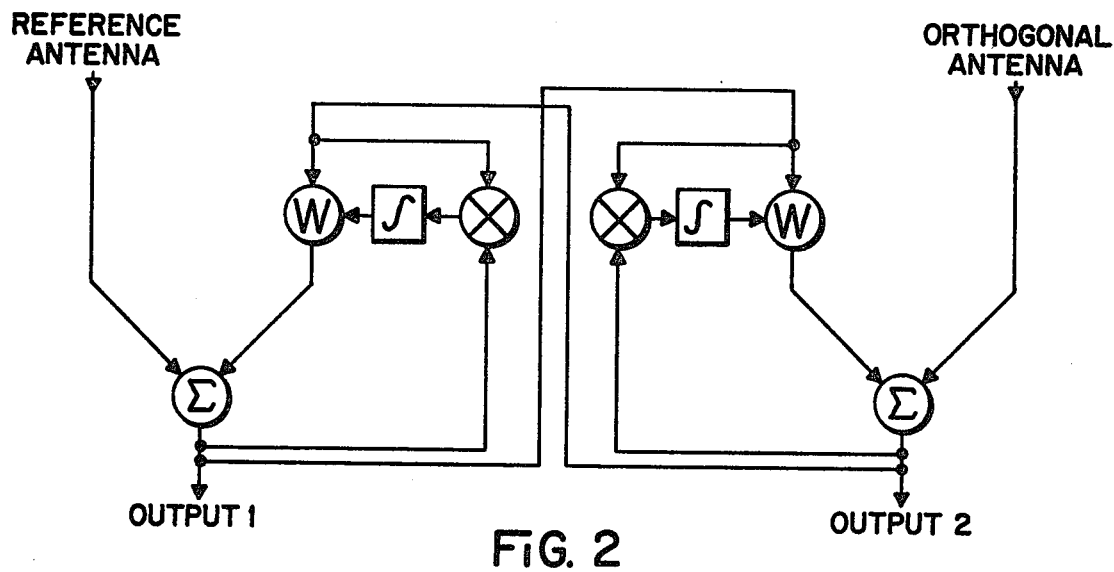
FIG. 2 is a block diagram similar to FIG. 2 of a simplified embodiment.

While in most embodiments, the signals picked off from the opposite channel will be split into in-phase and quadrature components and dual weighting devices and control apparatus will be utilized, it should be understood that theoretically, is some limited applications, it may be possible to simply apply the picked off signal directly to weighting and control circuitry, as illustrated in FIG. 2. Assuming the phase of the portion of the second carrier picked off the output of the second summing device is approximately equal to the phase of the portion of the second carrier mixed with the first carrier in the first channel, it could be possible to simply control the amplitude of the picked off portion of the second carrier to substantially null out the second carrier from the first channel. Similarly, the first carrier can be nulled out from the second channel in the same fashion. Circuitry for accomplishing this is illustrated in block form in FIG. 2. Since the circuitry in FIG. 2 operates essentially as described with relation to the circuitry of FIG. 1, no detailed description of the components or operation of FIG. 2 is deemed necessary. Many other modifications may be devised by those skilled in the art relative to the apparatus for shifting the phase and/or altering the amplitudes of the signals which are combined to provide the orthogonality. Further, it should be understood that the summing devices 20 and 22 disclosed herein include any circuits for combining the various singals in the proper phase and amplitude and should include any circuits for directly adding the signals, subtracting signals, or in any other fashion combining these signals to provide the desired result.

Thus, an adaptive undesired signal canceller is disclosed which makes it possible to obtain substantially improved orthogonality between signals in a communications system. Further, the present adaptive undesired signal canceller is simpler to construct and easy to incorporate into a presently operating system. While we have shown and described specific embodiments of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

What is claimed is:

1. An adaptive undesired signal canceller comprising:
   a. first summing means adapted to receive a first signal accompanying a portion of a second signal;
   b. second summing means adapted to receive the second signal accompanying a portion of the first signal;
   c. first means coupling a portion of a signal from the output of said second summing means to said first summing means for substantially cancelling the portion of the second signal accompanying the first signal therein;
   d. second means coupling a portion of a signal from the output of said first summing means to said second summing means for substantially cancelling the portion of the first signal accompanying the second signal therein; and
   e. said first and second means including weighting means for adjusting the amplitudes of the portions of summing means output signals coupled, respectively, therethrough, said weighting means having associated therewith control means sensitive to the output signal of the associated summing means for controlling said weighting means so that the portions of the first and second signals are substantially cancelled from the second and first signals, respectively, in the output.

2. An adaptive undesired signal canceller as claimed in claim 1 wherein each weighting means further includes circuitry for adjusting the phase of the portions of summing means output signals coupled, respectively, therethrough.

3. An adaptive undesired signal canceller comprising:
   a. first summing means adapted to receive a first signal accompanying a portion of a second signal;
   b. second summing means adapted to receive the second signal accompanying a portion of the first signal;
   c. first means coupling a portion of a signal from the output of said second summing means to said first summing means for substantially cancelling the portion of the second signal accompanying the first signal therein;

d. second means coupling a portion of a signal from the output of said first summing means to said second summing means for substantially cancelling the portion of the first signal accompanying the second signal therein; and e. said first and second means each including quadrature means for splitting signals applied thereto into an in-phase and quadrature component and weighting means for adjusting the amplitude of each component.

4. In a communications system including a first channel adapted to receive data on a first carrier and a second channel adapted to receive data on a second carrier having a frequency substantially equal to the frequency of the first carrier and polarized approximately orthogonal thereto and wherein degradation in the orthogonality occurs during transmission so that a portion of the first carrier appears in the second channel and a portion of the second carrier appears in the first channel, an adaptive undesired signal canceller comprising:

a. first summing means having first input means connected to receive the first carrier having a portion of the second carrier therewith, second input means and output means;

b. second summing means having first input means connected to receive the second carrier having a portion of the first carrier therewith, second input means and output means;

c. first weighting means having output means connected to the second input means of said first summing means and signal input means connected to the output means of said second summing means, said first weighting means being controllable to alter the phase and amplitude of signals applied to the signal input means thereof;

d. first control means connected to receive signals from the output means of said first and second summing means and further connected to control said first weighting means so that the phase and amplitude of the portion of the second carrier applied thereto from the output means of the second summing means is adjusted to substantially cancel the portion of the second carrier present at the first input means of said first summing means;

e. second weighting means having output means connected to the second input means of said second summing means and signal input means connected to the output means of said first summing means, said second weighting means being controllable to alter the phase and amplitude of signals applied to the signal input means thereof; and f. second control means connected to receive signals from the output means of said first and second summing means and further connected to control said second weighting means so that the phase and amplitude of the portion of the first carrier applied thereto from the output means of the first summing means is adjusted to substantially cancel the portion of the first carrier present at the first input means of said second summing means.

5. An adaptive undesired signal canceller as claimed in claim 4 wherein the output means of the first and second summing means each include a quadrature hybrid connected to split signals therefrom into inphase and quadrature signals.

6. An adaptive undesired signal canceller as claimed in claim 4 wherein the first and second control means each include correlating means connected to correlate a portion of output signals from each of the first and second summing means.

* * * * *